(12) United States Patent
Barss

(10) Patent No.: US 10,301,872 B2
(45) Date of Patent: May 28, 2019

(54) WASTE-FREE METHOD OF MAKING WINDOW TREATMENTS

(71) Applicant: Comfortex Corporation

(72) Inventor: James Barss, Porter Corners, NY (US)

(73) Assignee: Comfortex Corporation, Watervliet, NY (US)

( * ) Notice: Subject to any disclaimer, the term of this patent is extended or adjusted under 35 U.S.C. 154(b) by 409 days.

(21) Appl. No.: 14/757,411

(22) Filed: Dec. 23, 2015

(65) Prior Publication Data

US 2016/0115733 A1 Apr. 28, 2016

Related U.S. Application Data

(63) Continuation of application No. 13/889,929, filed on May 8, 2013, which is a continuation of application
(Continued)

(51) Int. Cl.
*E06B 9/266* (2006.01)
*E06B 9/386* (2006.01)
(Continued)

(52) U.S. Cl.
CPC ............ *E06B 9/266* (2013.01); *B29C 65/483* (2013.01); *B29C 65/524* (2013.01); *B29C 65/7891* (2013.01); *B29C 66/112* (2013.01); *B29C 66/1122* (2013.01); *B29C 66/131* (2013.01); *B29C 66/1312* (2013.01); *B29C 66/437* (2013.01); *B29C 66/729* (2013.01); *B29C 66/8242* (2013.01); *B29C 66/8322* (2013.01); *E06B 9/0692* (2013.01); *E06B 9/386* (2013.01); *B29C 65/4835* (2013.01); *B29C 66/71* (2013.01);
(Continued)

(58) Field of Classification Search
CPC .... E06B 9/266; E06B 9/386; Y10T 156/1062; Y10T 156/1075
See application file for complete search history.

(56) References Cited

U.S. PATENT DOCUMENTS

| | | | | |
|---|---|---|---|---|
| 4,885,190 A | * | 12/1989 | Schnebly | B31D 3/0215 156/197 |
| 5,516,385 A | * | 5/1996 | Romeo | B29C 53/043 156/200 |

(Continued)

*Primary Examiner* — Mark A Osele
*Assistant Examiner* — Christopher C Caillouet
(74) *Attorney, Agent, or Firm* — Harness, Dickey & Pierce PLC

(57) ABSTRACT

An apparatus and method are disclosed for forming cellular or non-cellular window shades directly from raw stock to the final desired window shade color, height and width to fit a particular window size, with essentially no wasted material. The shade is fabricated from a bonded array of a predetermined number of stacked, identically shaped and sized, elements or preforms of uniform length corresponding to one of the height or width dimensions of the desired window covering. The number of preforms is selected so that the length of the fully expanded array will correspond with the other of the height or width dimensions of the window covering. The raw stock is in the form of a continuously fed narrow strip of uncolored fabric to which the necessary coloring, folding, cutting-to-length, stacking and bonding steps are applied within the disclosed apparatus.

41 Claims, 6 Drawing Sheets

Related U.S. Application Data

No. 12/212,260, filed on Sep. 17, 2008, now Pat. No. 8,465,617.

(51) Int. Cl.
  *B29C 65/78*    (2006.01)
  *B29C 65/00*    (2006.01)
  *B29C 65/52*    (2006.01)
  *B29C 65/48*    (2006.01)
  *E06B 9/06*     (2006.01)
  *B29K 67/00*    (2006.01)

(52) U.S. Cl.
  CPC ........ *B29C 66/721* (2013.01); *B29C 66/7294* (2013.01); *B29K 2067/00* (2013.01); *Y10T 156/1052* (2015.01); *Y10T 156/1056* (2015.01); *Y10T 156/1062* (2015.01); *Y10T 156/1075* (2015.01)

(56) References Cited

U.S. PATENT DOCUMENTS

| | | | | |
|---|---|---|---|---|
| 5,714,034 | A * | 2/1998 | Goodhue | B29C 65/524 156/197 |
| 6,286,920 | B1 * | 9/2001 | Ridgway | B41J 3/4073 347/2 |
| 6,634,409 | B2 * | 10/2003 | Corey | B29C 66/437 160/236 |
| 2006/0185787 | A1 * | 8/2006 | Yu | B31D 3/023 156/227 |

* cited by examiner

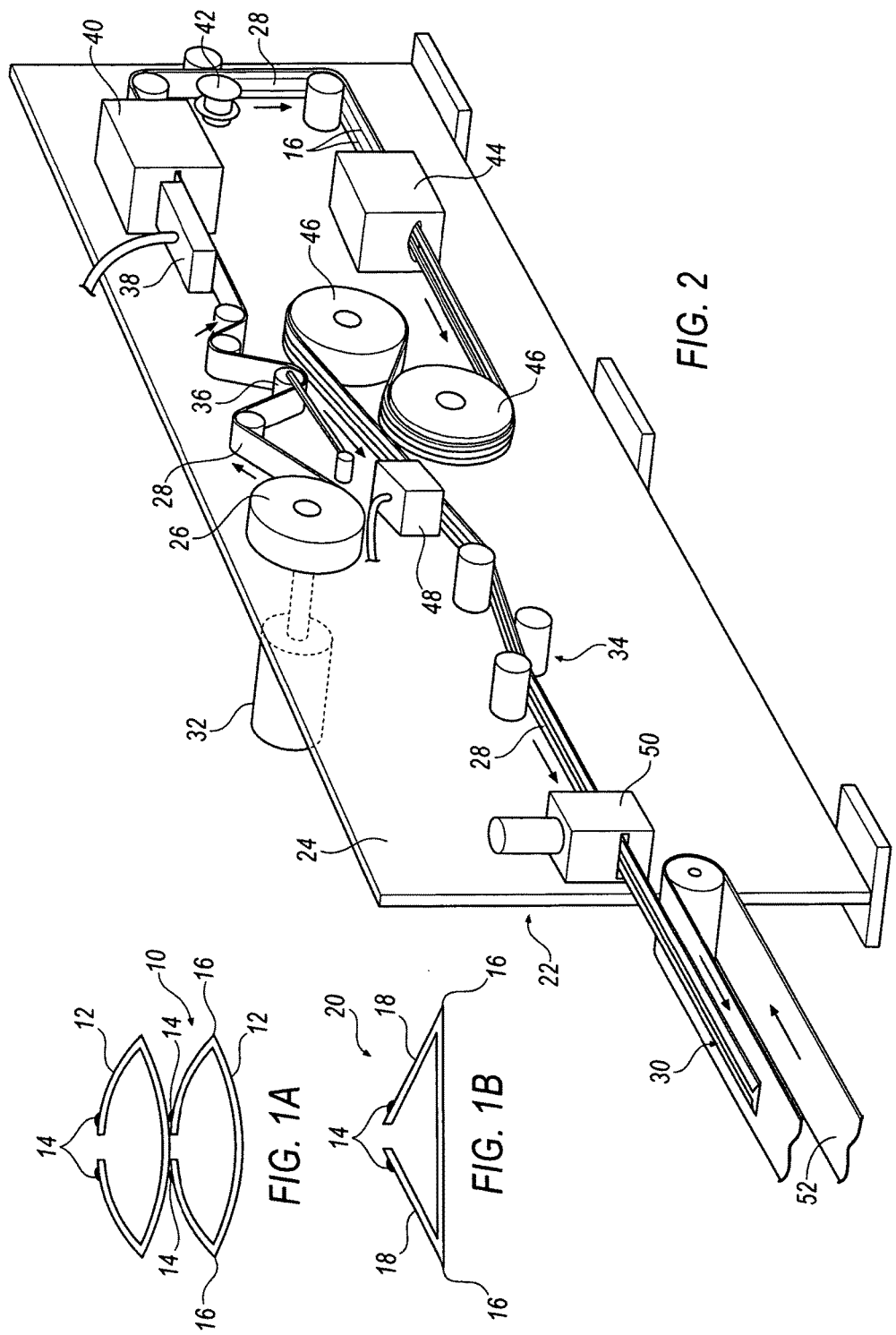

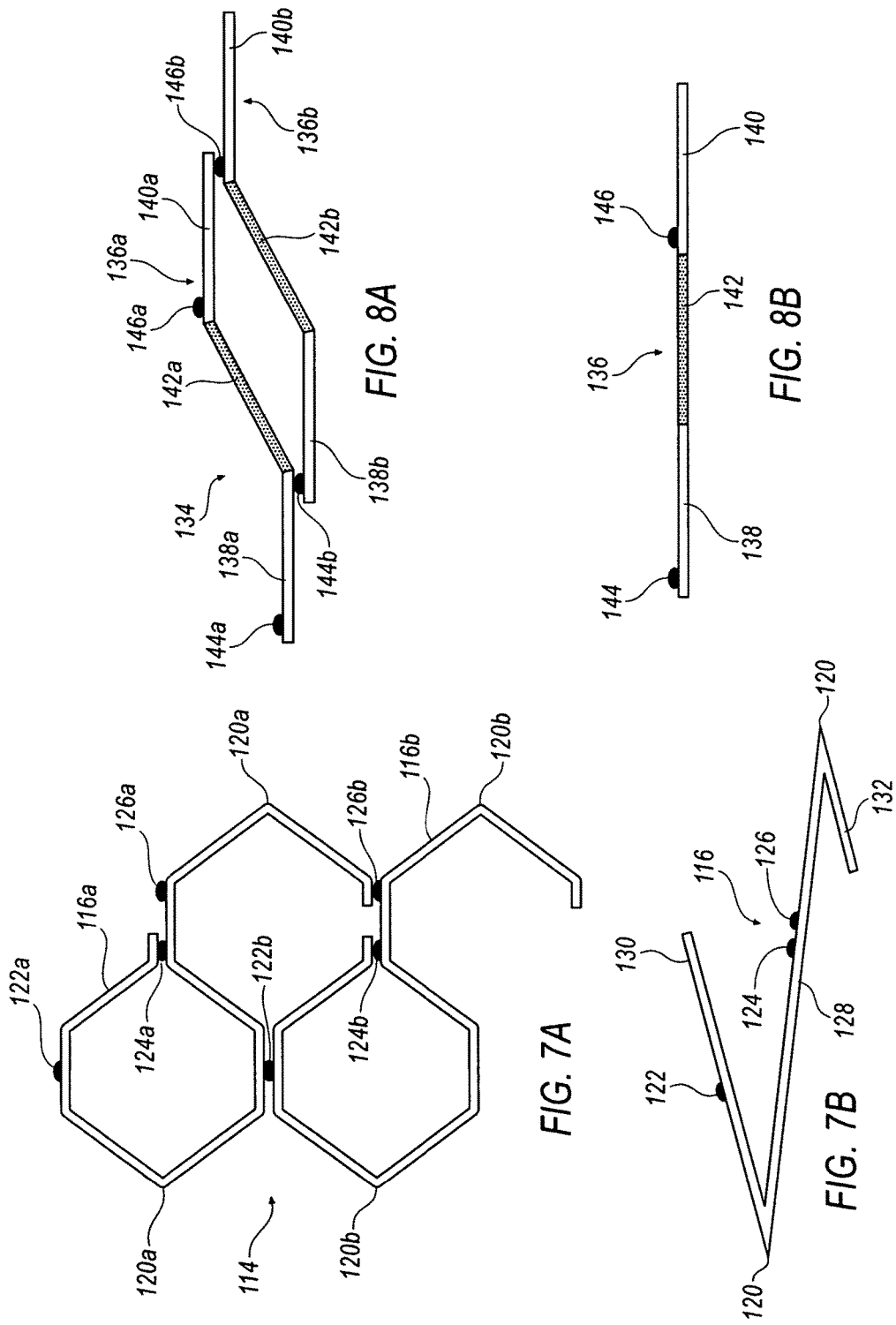

WASTE-FREE METHOD OF MAKING WINDOW TREATMENTS

This application is a continuation which claims priority to U.S. application Ser. No. 13/889,929 filed May 8, 2013, which claims priority to U.S. application Ser. No. 12/212,260 filed on Sep. 17, 2008 and is now U.S. Pat. No. 8,465,617, the entireties of which are hereby incorporated by reference.

FIELD OF INVENTION

This invention relates to window coverings, and more particularly to an improved method of fabricating and assembling window coverings of the type comprising expandable honeycomb or cellular window coverings formed of flexible fabric material. The disclosed method can also be used to form other types of window covering products that are, or can be, built up from joined and repeating elements, such as fabric-vane window shadings, pleated shades, Roman shades and roller shades.

BACKGROUND OF INVENTION

For purposes of the present description, a "shade" type of window covering is a type of area goods or panel whose final form is either (1) a single, continuous, integral piece of flexible fabric, without seams or joints in the fabric, as exemplified by the common roller shade, or (2) a series of identical or very similar strips of flexible fabric, directly contacting and connected to adjacent such strips by gluing, stitching, ultrasonic welding or the like, as exemplified by certain commercially available cellular honeycomb shades. In contrast, and also for present purposes, a "blind" is neither a type of area goods nor a panel, but instead comprises a series of separate, usually substantially rigid and opaque, elements (often called "slats" or "vanes") that are connected to one or more articulating members that permit the elements to be tilted through varying degrees of inclination to control the amount of light and visibility through the blind. Unlike a "shade," the elements of a "blind" are not directly joined (such as edge-to-edge) to the adjacent element in the series.

A third type of product, a "fabric-vane window shading," combines some of the physical characteristics of both a shade and a blind. An example of such a product is shown in Corey, U.S. Pat. No. 6,024,819, wherein the product is described as a "fabric Venetian blind." The vanes may be formed of a relatively opaque fabric, rather than a rigid material as in the case of a conventional Venetian blind, and are interconnected by full-area front and rear panels of a sheer or relatively translucent material. Thus, the resulting product is in the form of a panel comprising multiple stacked expandable cells, each of which is defined by upper and lower vanes and a portion of each of the front and rear panels. In that sense, a "fabric-vane window shading" constitutes a "shade" rather than a "blind" under the definitions used herein. It will therefore be referred to as a "fabric-vane window shading" in the present patent application.

Also, as used herein, "preform" refers to an elongated strip-like element or constituent part of a shade panel, which element may be flat or folded, single or multiple-piece, which has been cut to final (or final but for minor trimming) length for use in a window covering fabricated to fit a window of a particular size. This preform, or intermediary product, when joined directly along its longitudinal edges to identical or substantially identical adjacent preforms in a stack of such preforms, forms the panel portion of a window covering.

In the various embodiments disclosed herein, the preforms are typically described as having a "length" corresponding to the "width" of the window for which the completed window covering is ordered, because the preforms will be most commonly be oriented horizontally when installed in such window. Also, for the same reason, it is contemplated that the accumulation step where successive preforms are placed in side-by-side adjacency for compression and bonding, will usually be in a vertical "stack." However, it is to be understood that the process disclosed herein could also be used for making window coverings having vertically oriented elements or preforms, where the "length" of the preform will be oriented vertically, parallel to the "height" dimension of the window to be covered. Similarly, the "stacking" step could be implemented by bringing successive preforms into horizontal or inclined, rather than vertical, adjacency.

In all cases discussed herein, the fabric panel portion of the window covering is suitable for, and intended to be assembled to, appropriate hardware, such as top and bottom rails, control cords or wands, and the like, to facilitate installation and operation.

A popular type of window covering is a cellular window shade, made from either individual folded strips bonded to adjacent strips or a continuous transversely folded sheet of flexible web (fabric or film). The fold lines are set by a thermal curing process, and a stack of the folded strips or sheet is then bonded along adjacent parallel bond lines to create an expandable honeycomb structure in the form of a continuous column of joined cells.

U.S. Pat. Nos. 4,450,027 and 4,603,072 to Colson describe one method of forming a "single-cell" honeycomb window covering, i.e., a product having a single column of joined expandable cells. According to that method, a continuous narrow strip of longitudinally moving flexible material is progressively folded into a flat, generally C- or U-shaped tube and then thermally treated to set the folds, while maintaining tension in the tube. Longitudinal lines of adhesive are then applied to the moving tube, and the tube is spirally wound onto a rotating frame having elongated flat portions, thereby creating a stack of cells of single-cell width that are adhered to each other by the previously applied adhesive. Straight sections of this bonded stack are then severed from the remainder of the wound tubing. This method is time-consuming and expensive, and generates non-flat portions of the winding that connect the adjacent flat portions of the rotating frame and that must be scrapped. The resulting bolt of expandable single-cell honeycomb fabric may be 12 or more feet wide and 40 feet long in its fully expanded condition. These bolts are then placed in inventory until needed to fill a customer order. In response to a specific customer-ordered window width and height, a stocked oversize bolt or panel of the ordered color and pattern is cut down to the required width and number of cells to provide the drop length needed for the height of the ordered windows, requiring skilled labor and inevitably resulting in substantial waste even if the remaining portion of a given bolt is returned to the inventory. Because future ordered window sizes cannot be predicted, except in a statistical way, operators must use complex and imperfect algorithms to minimize the residual waste as individual window-size sections are cut from the stocked blocks. Typical waste factors in converting blocks to window-size sections range from 25% in smaller shops to 15% in large-volume fabricators with steadier order streams.

A similar method is disclosed in Anderson, U.S. Pat. No. 4,631,217, where the initially folded and creased material has a Z-shaped cross-section, with each winding of such strip forming the front of one cell and the rear of an adjacent cell after stacking and bonding.

A later-developed method of forming expandable honeycomb fabric is disclosed in commonly-assigned U.S. Pat. No. 5,193,601 to Corey et al. That method involves continuously feeding a broad web of flexible material, having a width that is at least as wide as the required width of the window covering, through a web-treating stage where desired coloring or patterning are printed onto the material. The web is then fed through appropriate drying or curing zones, and then between printing rollers that apply transverse parallel lines of adhesive at predetermined longitudinally spaced locations on the moving web. The web then passes through a station that partially cures the lines of adhesive to an intermediate, handlable state. The web next passes through a creasing and pleating apparatus that forms transverse fold lines at predetermined intervals and predetermined locations relative to the adhesive lines. A predetermined length of the web, now folded into a creased and generally serpentine shape, is then severed from the upstream portion of the web and collected and compressed into a stack, where the adhesive is further cured to permanently bond adjacent folds in a predetermined cellular pattern of double-cell width. This double-cell product can also be used to make single-cell panels by simply cutting off one of the columns (which, to reduce waste, is initially made narrower by shifting the adhesive line position), or by severing alternate internal ligaments between adjacent front and rear cells. While faster than Colson's method, this method requires containment of large stacks of material for curing, usually done thermally by heating the entire stack and its containment structure. That heating method consumes excessive energy and time, and carries a risk of thermal distortion of the stack.

The initial web is typically formed into large bolts in the form of columns of expandable cells, typically 10 ten feet wide and 40 feet in fully expanded length. As in the case of the single-cell product described above, the inventorying, subsequent cutting labor and scrapped material is costly.

Another method of forming a generally cellular type of product is disclosed in commonly-assigned Corey, U.S. Pat. No. 6,024,819. There, a fabric-vane window shading comprising sheer front and rear panels and relatively opaque fabric vanes is formed from an initial elongated, narrow, three-element strip having an opaque central portion secured by adhesive, stitching or other bonding technique along its two longitudinal edges to adjacent sheer strips. Of course, the three elements could be made from other materials, with the three components being the same or different. That three-element strip is then helically wound onto a supporting surface, with each successive winding only partially overlapping the immediately preceding winding (like slabs of bacon in a display pack) and bonded together along longitudinally extending bond lines. Finally, the resulting loop of layered material is cut open along a cutting line perpendicular to the longitudinally extending bond lines and then stored in rolls that may be 10 feet wide and 13-14 feet long if unrolled to the full drop-length of the deployed condition. As in the case of the other disclosed methods, the cutting down of the initially formed cellular product into smaller pieces for specifically sized window coverings requires skilled labor and results in substantial amounts of scrapped material.

There is a need for a more economical method of forming cellular window shades and other types of window treatments such as Roman-style shades and fabric-vane window shadings, each of which type of shade is (or could be) made from joined and repeating flexible elements. Specifically, it would be desirable to eliminate the need to initially form and stock broad panels or bolts of such formed goods in various colors and patterns, from which individual window coverings must later be cut to fill customer orders for window coverings of specified length and width, with inevitable scrapping of unusable left over material.

SUMMARY OF INVENTION

As described below, a window covering of finished length, width, color and pattern may be formed in a continuous process directly from uncolored fabric, by forming a plurality of elongated, identically-shaped, elements or preforms of either flat or folded cross-sectional shape, cutting the preforms to a substantially finished length corresponding to one of the final dimensions of the finished window covering, applying adhesive to each preform either before or after the cutting step, stacking (vertically, horizontally or inclined) a predetermined number of the preforms as required to establish another of the final dimensions of the finished window covering, and bonding adjacent preforms together into an integrated window covering by curing the adhesive.

BRIEF DESCRIPTION OF THE DRAWINGS

FIG. 1A is an end view of a two-cell fragment of a single-cell type of expandable honeycomb window covering, made from the two preforms of the type shown in FIG. 1B, and shown in slightly expanded condition.

FIG. 1B is an end view of a cell preform adapted for stacking and assembly into a single-cell window covering as shown in FIG. 1A.

FIG. 2 is a simplified schematic perspective of strip-forming apparatus used for making single-cell preforms of the type shown in FIG. 1B in accordance with the present invention.

FIG. 7A is an end view of a fragment of a double-cell type of expandable honeycomb window covering, made from two preforms of the type shown in FIG. 7B, and shown in expanded condition.

FIG. 7B is an end view of a cell preform adapted for stacking and assembly into a double-cell window covering as shown in FIG. 7A.

FIG. 8A is an end view of a fragment of a fabric-vane window shading type of window covering, made from two preforms of the type shown in FIG. 8B, and shown in a partial light-admitting condition.

FIG. 8B is an end view of a cell preform adapted for partially overlapping stacking and assembly into a fabric-vane window shading as shown in FIG. 8A.

DETAILED DESCRIPTION OF PREFERRED EMBODIMENT

Figure 3:
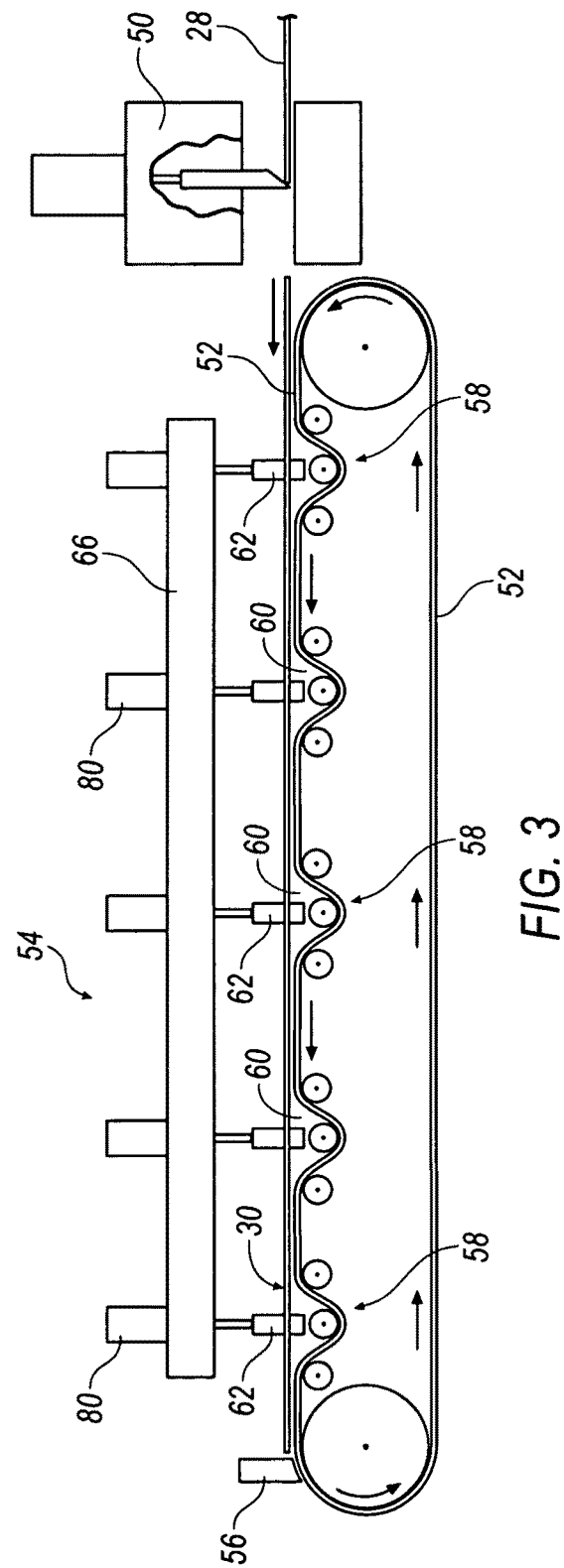
FIG. 3 is a simplified schematic side view of a portion of a preform receiver/stacker apparatus for use in making cellular window coverings in accordance with the present invention.

FIG. 1A illustrates an end view of a portion of a conventional single-cell honeycomb panel 10, such as widely used for shade-type window coverings. For illustration purposes, this portion comprises just two identical cells 12 bonded together by a pair of adhesive bead lines 14 that typically extend longitudinally along the full length of the elongated cells. One conventional way of forming cells 10 is to crease an initially flat elongated strip of fabric along two longitudinal crease lines 16 and then fold the outer portions inwardly toward the strip center line to form flaps 18, thus creating a "preform" 20 in the shape shown in FIG. 1B. Next, two parallel lines or beads of adhesive 14 are applied adjacent to the edges of flaps 18, these adhesive lines preferably extending for the full length of the preform. A single-cell column or panel of honeycomb material may then be created by aligning, stacking and heat-curing the adhesive lines in a stack of the thus-formed preforms 20.

A preferred strip-forming apparatus 22 is illustrated in the simplified schematic of FIG. 2. Fabric supply roll 26 and the other illustrated components are secured to one or more vertical support panels 24. In this illustrated embodiment, the supply roll carries uncolored, unpatterned, flat fabric strip 28. The width of strip 28 is selected to create the single-cell preform illustrated in FIG. 1B, a preform that has no overlap when creased and folded. Alternatively, the strip width could be selected to provide an overlap of the preform edges if desired for the particular type of cell being formed. The fabric may be a woven textile made of cloth or polyester thread, or non-woven materials such as thin-film polyester. As will be described below, alternative processes could begin with a roll of pre-colored and patterned fabric, or the supply roll fabric could be pre-folded or a composite of multiple, joined, adjacent or superimposed, strips of identical or differing material, texture or opacity.

Strip 28 is pulled through apparatus 22, until it emerges as a fully formed and cut-to-length preform 30, by the combined control of supply reel motor 32, a pair of servo motor-driven nip or pulling rolls 34 and a pivoting, counterweighted, tension-leveling dancer 36, all conventional. From dancer 36, strip 28 passes through digital ink jet printer 38, where desired color and pattern is applied. Applicant has used a Fuji Film Dimatix printer, with associated proprietary software, for this purpose. The colored strip then moves into curing station 40, where the ink is set, preferably by high intensity UV radiation. Strip 28 then goes through creasing station 42 where, in the case of the single-cell preform 20 of FIG. 1B, a pair of spring-loaded, sharp-edged creaser wheels, in conjunction with a backer roll, impresses two crease lines 16 into the strip near to the ¼-width points in from each edge of the strip. This conventional type of creasing station is shown in schematic, simplified form in FIG. 2, and is more fully described and illustrated in the aforementioned Colson patent, U.S. Pat. No. 4,450,027.

After creasing, strip 28 is drawn through a conventional folding station 44, also shown in simplified and schematic form. This station may comprise a series of rollers of progressively changing shape or orientation and/or a channel which act to fold flaps 18 upwardly and then back down against the central portion of the strip, into the configuration shown in FIG. 1B. Exemplary components of a conventional folding station are illustrated and described in the aforementioned Colson patent, U.S. Pat. No. 4,450,027. The folded strip then passes around a pair of heated drums 46 to set or iron in the folds, and then through an adhesive applicator station 48, also shown in schematic form. There, liquid bonding material, preferably a polyester hot melt adhesive, is supplied from a pump (not illustrated) and fed to nozzles that apply continuous, uniform, parallel adhesive beads 14 near to the flap edges. See Colson patent, U.S. Pat. No. 4,450,027, for further exemplary details. The adhesive only partially cures to a gel state while in strip former assembly 22, so that it will achieve a firm bond only after it is subsequently brought into contact with an adjacent preform and thereafter fully cured by the application of heat, as described below.

Finally, the folded but still continuous strip 28 is cut to a predetermined length by cut-off knife 50 and deposited onto receiver belt 52. The main process controller (not illustrated) utilizes data from the servo motors that drive nip rolls 34 to generate digital instructions to time the cutting stroke of knife 50 and thereby achieve the predetermined preform length. Preferably, belt 52 travels faster than the speed of strip 28 through strip former assembly 22, to assure that preform 30 is adequately spaced from following strip portions to avoid collisions and possible misalignment on belt 52.

An apparatus and method similar to that described immediately above is described in commonly assigned U.S. provisional applications 61/029,201 and 61/030,164, filed Feb. 15, 2008 and Feb. 20, 2008, respectively. There, individual cells are formed from a continuously-fed narrow strip of uncolored fabric, including the steps of coloring by digital ink jet printing, folding and cutting to predetermined lengths. However, in the process disclosed therein, the individual cells are not accumulated and bonded directly to each other to form an integrated array of cells, but instead form a blind-type of window covering having spaced-apart, separately expandable, cell-like vanes.

Figure 4:
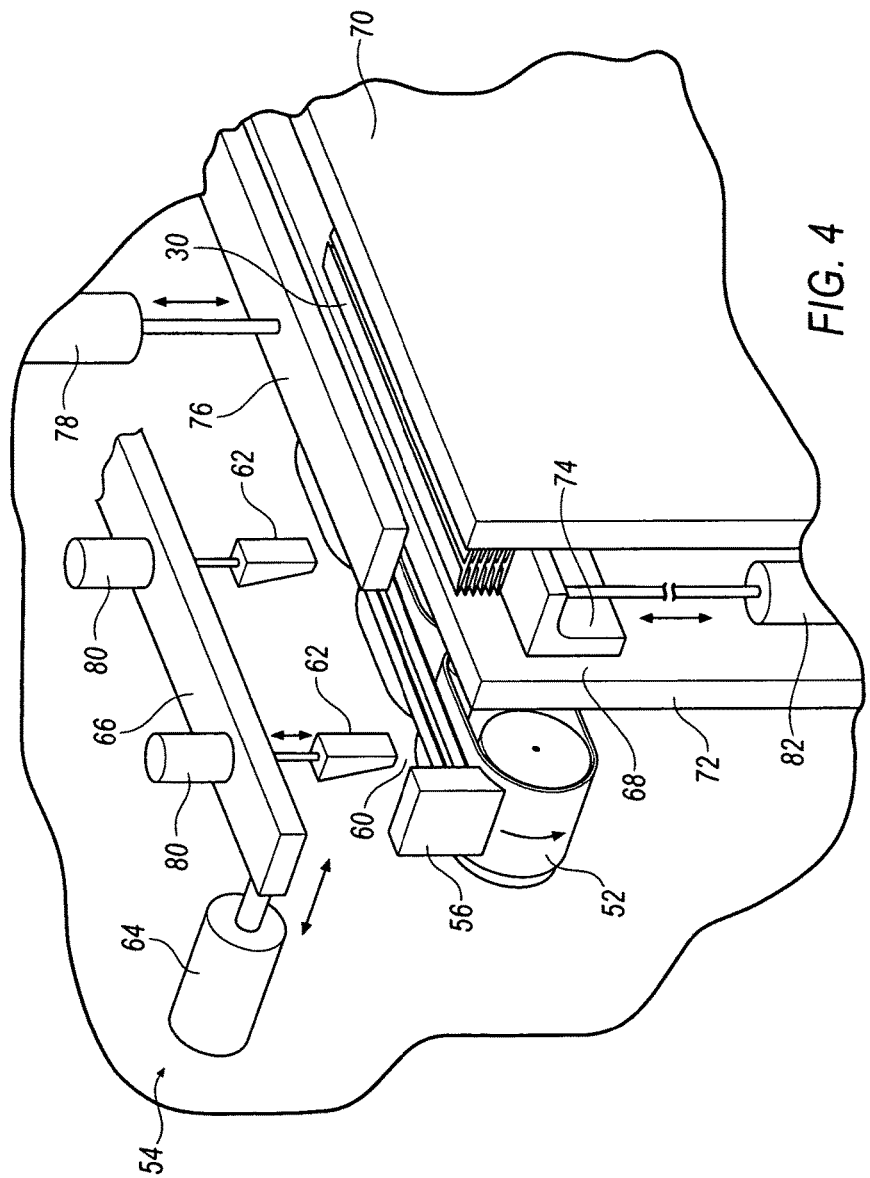
FIG. 4 is a fragmentary simplified schematic perspective view of a portion of the apparatus of FIG. 3, additionally showing a portion of the cell preform accumulator chute.
Figure 5:
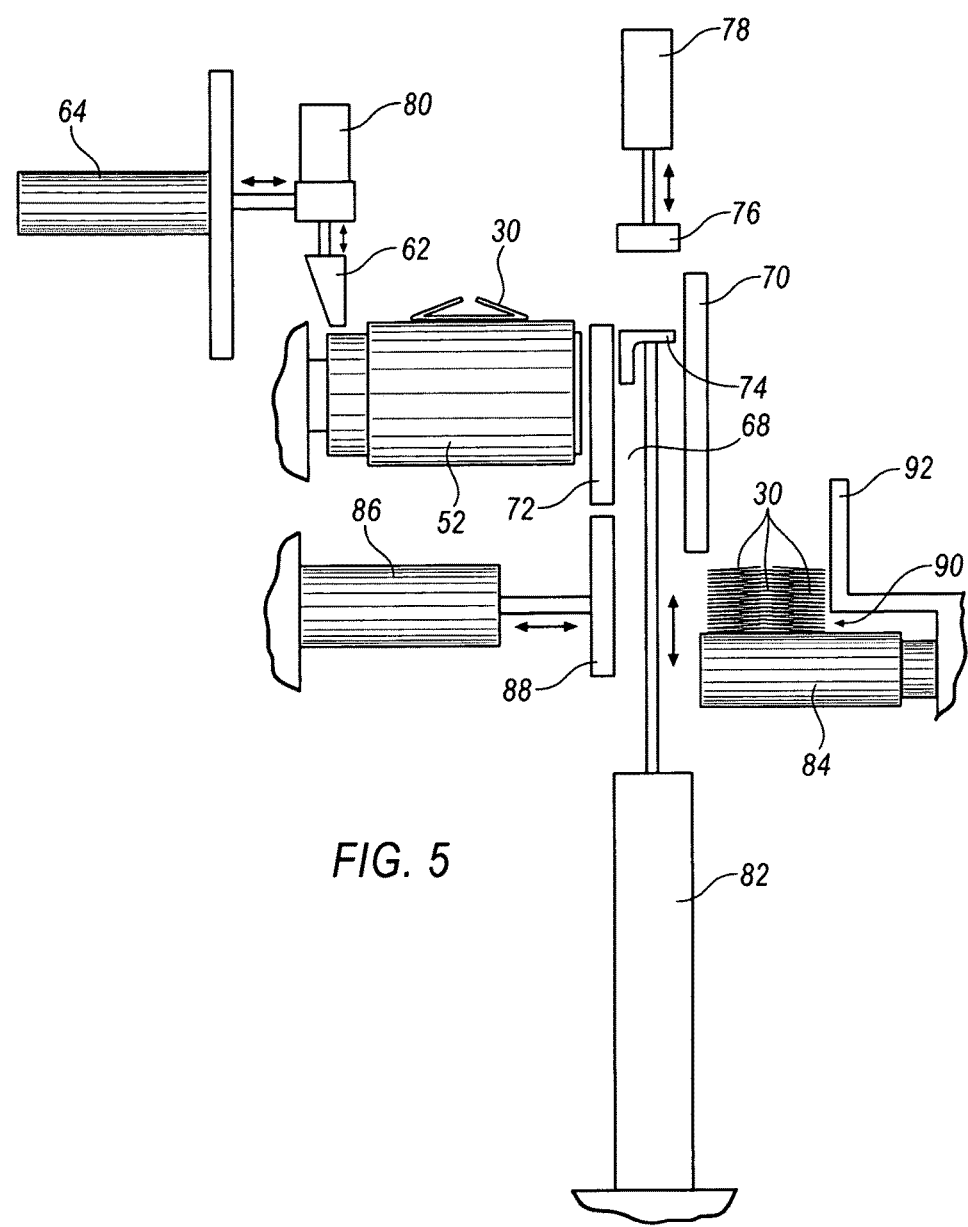
FIG. 5 is a simplified schematic end view of the apparatus of FIGS. 3 and 4.

As shown in FIGS. 3-5, cut-to-length preform 30 is conveyed along receiver/stacker assembly 54 by receiver belt 52 until it hits feed stop 56. The length of assembly 54 should be not less than the width of the greatest shade (i.e., the length of preforms 30) to be produced. Several sets of longitudinally-spaced idler rollers 58 function to create belt dip zones 60, where belt 52 dips below the horizontal plane of conveyance of preforms 30. These dip zones provide clearance for a series of preform stacker fingers 62 to push preforms 30 laterally off belt 52, without obstruction by or interference with the belt, once longitudinal movement of the preform has been stopped by feed stop 56. The preforms have sufficient rigidity to ride across dip zones 60 as they are conveyed toward stop 56. Because even short preforms need at least two stacker fingers to push them without misalignment of the preform, the pair of stacker fingers nearest stop 56 should be more closely spaced than the other pairs. Further, the spacing between successive pairs of pushers preferably increases uniformly from that end toward the cutter end, to assure optimum pusher position for a full range of preform lengths with the minimum number of pushers.

An optical interrupt (not shown) senses the presence of a newly arrived preform at stop 56, and signals stacker ball-screw drive 64 (see FIG. 4) to cause stacker bar 66 and its associated set of stacker fingers 62 to stroke transversely across receiver belt 52. This movement causes fingers 62 to engage the edge of the stopped preform and push it to accumulator chute 68, which is defined as the space between chute back plate 70 and chute front plate 72. The top edge of back plate 70 is slightly higher than the upper run of receiver belt 52 and the preform carried thereby, so that it acts as a locating stop to vertically align transversely moving preform 30 with previously accumulated preforms. Once the preform engages back plate 70 it will come to rest upon elevator bar 74, or upon the uppermost preform that was previously deposited there by stacker fingers 62. The longitudinal position of the accumulated performs will also be identical, because each preform abutted stop 56 when it was engaged by the stacker fingers. That is, the respective opposite ends of the preforms in the stack will be laterally aligned with each other, forming opposite longitudinal edges of the array that are substantially perpendicular to the length of the preforms.

While fingers 62 are still engaging the now stationary uppermost preform 30, tamper bar 76 is stroked downwardly by tamper cylinder 78 to initially compress the stack of preforms on elevator bar 74 and aid in preform-to-preform adhesion. As stacker bar 66 begins its return horizontal stroke over receiver belt 52, fingers 62 are raised relative to stacker bar 66 by stacker finger lift cylinders 80 so that the fingers will clear the next preform 30 that is moving along receiver belt 52 toward stop 56. In this way, the advance and return strokes of stacker bar 66 can proceed at a slower cycle time than the time elapsed while the following preform is advancing along receiver belt 52 toward stop 56, avoiding the need to reduce the speed of fabric strip 28 through strip forming assembly 22. At the conclusion of the return stroke of stacker bar 66, stacker fingers 62 are lowered by finger lift cylinders 80 to be in position to engage the following preform 30 when stacker bar 66 next strokes toward accumulator 68. In this regard, the distance from cut-off knife 50 to feed stop 56, along with the linear speeds of belt 52 and strip 28 through strip former 22, should be coordinated so that the leading edge of a given preform 30 has not advanced as far as the first (right-hand in FIG. 3) stacker finger 62 until the latter, is in its lowered position for engaging and laterally pushing the preceding preform 30, has completed its pushing stroke across belt 52.

As best shown in FIGS. 4-5, the elevations of elevator bar 74 and the stack of preforms 30 resting thereon are controlled by elevator cylinder 82. Elevator bar 74 descends by a pre-determined amount for each preform deposited thereon, while maintaining the top of the preform stack just below the height of belt 52 to avoid obstructing the lateral transfer of a preform from belt 52 onto the accumulating stack. This accumulator arrangement permits a continuous infeed of newly cut preforms 30 from strip former assembly 22, but efficiency further requires that a complete stack of the predetermined number of preforms necessary to form a customer-ordered shade be immediately removed from accumulator chute 68 so that the preceding operations can continue uninterrupted. The overall system controller keeps track of the number of preforms that have been transferred from belt 52 to accumulator chute 68, so that a completed stack containing the required number of preforms for the ordered window covering will be automatically and timely removed from the chute for further processing.

That removal step is performed by the apparatus illustrated in FIG. 5, which is a view looking upstream along the length of receiver belt 52 from a point downstream from the downstream end of belt 52 (in other words, from the left end of FIGS. 3-4 toward the right end thereof). The position of elevator cylinder 82 and the length of its stroke are selected so that the top of a completed stack 90 of preforms on elevator bar 74 can clear the bottom of chute back plate 70, enabling the stack to thereafter be moved to the right (as viewed in FIG. 5) and onto transfer belt 84. When stack 90 in accumulator chute 68 is completed, elevator cylinder 82 retracts elevator bar 74 until the topmost preform on the stack is below the bottom of chute back plate 70. Transfer cylinder 86 then strokes transfer bar 88 to the right, engaging and pushing completed preform stack 90 onto transfer belt 84 and against transfer stop wall 92. Transfer belt 84 may operate continuously if it has a smooth surface to permit it to freely slide beneath the stationary bottommost preform while the stack is held against stop plate 92 by transfer bar 88. Subsequent retraction of bar 88 would then free the stack to be conveyed by belt 84 to the adhesive-curing station (not shown in FIG. 5). Alternatively, belt 84 can be controlled to operate only after completed stack 90 has been deposited thereon by transfer bar 88. Vertically oriented rollers can be provided to confine and guide stack 90 as transfer belt 84 carries it to the curing station.

To permit the accumulation of a new stack to continue in accumulator chute 68 while elevator bar 74 is lowering a completed stack and returning to its uppermost position, a series of temporary accumulator fingers (not shown) can be provided. These temporary fingers may be in the form of narrow, flat, horizontal blades that slide horizontally (from right to left in FIG. 5) through slots in back chute plate 70. Once in position in accumulator chute 68, they can receive the first few preforms of the next stack until elevator bar 74 has risen to its uppermost position. Then, temporary accumulator fingers can be withdrawn, depositing the accumulated preforms onto elevator bar 74.

Figure 6:
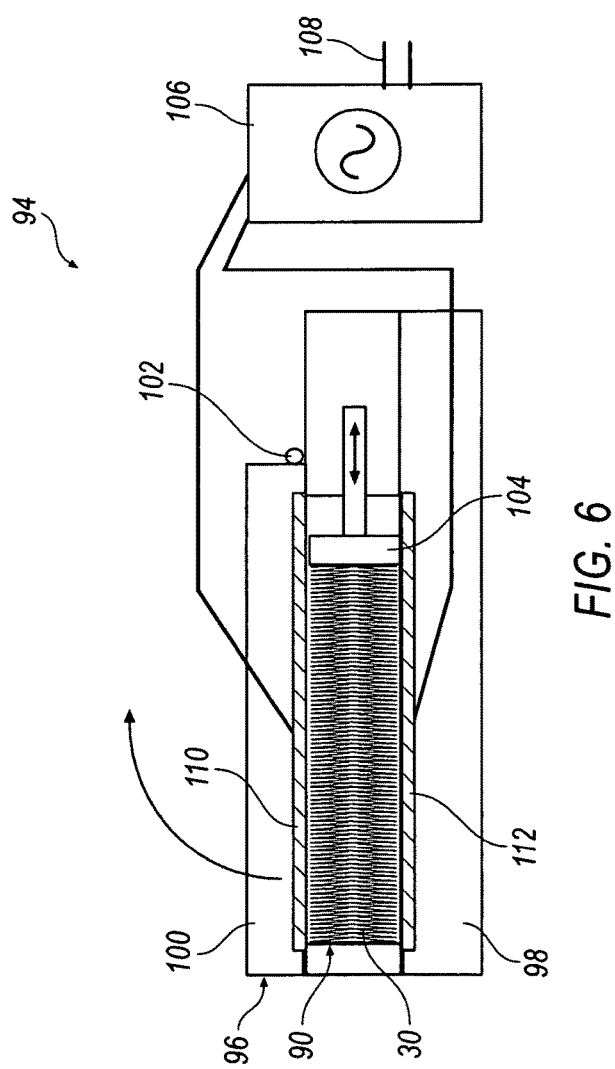
FIG. 6 is a simplified cross-sectional view of a radio frequency energy-emitting bonding press.

Transfer belt 84 conveys preform stack 90 to curing station 94, schematically illustrated in FIG. 6. The transfer belt serves as a wait-state holder for a queue of stacks. Therefore, its length may be selected as required, depending on the curing speed of the following heating and adhesive-curing step compared to the previously described stacking speed. The queue may be held on the belt, with the belt's smooth surface sliding under the queued stacks as they pile up gently against a stop at the downstream end of transfer belt 84 and until an operator removes a stack 90 from the belt and places it into heating press or platen 96. A radio frequency (RF) type of heating press is preferred, for reasons that will be explained below. Use of this form of heating, to preferentially heat the adhesive rather than the fabric, is disclosed in a commonly assigned published application, US 2007/0251637, published on Nov. 1, 2007, in which I am listed as a co-inventor.

Press 96 is preferably dimensioned to receive the largest contemplated stack size. The press 96 includes base 98 and lid 100 interconnected at hinge or hinges 102. A compression ram 104 is disposed at one end of the stack to assure alignment of all preforms 30 and to apply pressure to stack 90 and its adhesive lines. Stack 90 is placed in press 96, lid 100 closed and locked, and compression ram 104 advanced to compress the stack so that full contact is assured between the surfaces to be bonded by heated adhesive lines 14. Thereafter, an RF field is energized by generator 106, powered by an electrical input 108. Application of the resulting RF electromagnetic field by voltages on the conductive electrode platens 110, 112 of the curing apparatus 96 heats the adhesive lines (e.g., adhesive lines or beads 14 in FIGS. 1A and 1B) to trigger activation and curing of the adhesive, thereby bonding adjacent preforms together wherever adhesive lines are present between them.

Adhesives that are advantageously used with RF-field curing must be thermally curable and sensitive to excitation and self-heating or curing when exposed to RF electromagnetic fields. They should include compounds such as polyester monomers, metal salts, or nylon that readily absorb energy from such fields.

In an exemplary heating press 96, generator 106 is a 25 KW power supply that operates at 17 MHz. A frequency of 27.12 MHz is ideal for coupling to the adhesive, but field efficiency and stability is enhanced at lower frequencies, and coupling is still adequate. At that frequency, the fabric portion of the assembled preforms has significantly less energy absorption than the adhesive, minimizing the risk of thermal distortion of delicate fabrics. The temperatures of upper electrode 110 and lower electrode 112 are controlled to a constant temperature of 65 degrees Fahrenheit by chilled and heated water (not shown). The temperature is raised and lowered with changes in ambient temperature. The power and frequency are continually adjusted to compensate for load changes during curing. Compression ram 104 and upper electrode 110 pressures are deliverable pneumatically in two stages between 20 and 50 pounds per square inch (PSI).

In one exemplary process, stack 90 is placed in press 96 and onto lower electrode 112. Lid and upper electrode 110 are lowered to a predetermined height in contact with the stack. The stack is initially compressed by pneumatic ram 104, at which time the RF field is activated at 3.5 amps to preheat adhesive lines 14 without forcing stack 90 out of stacked alignment. After a predetermined time, the adhesive lines have been softened, the stack is then further compressed, and the RF field is reduced to 2.75 amps to complete the bonding. After a second predetermined period of time, the RF field is terminated and the stack remains under pressure for an additional predetermined cooling period to cool in position, setting the bonds. After the cooling cycle, upper lid 100 and upper electrode 110 are raised and the fully bonded and cured stack 90 is removed from press 96. The bonded array or panel is then ready for assembly to secondary components, such as top and bottom rails and control cords or wands, in conventional manner.

A final trimming step may be necessary if the ends of the individual preforms in the bonded stack are not perfectly aligned. For that purpose, the process may be set up so that preforms 30, as cut-to-length by cut-off knife 50, are very slightly over-length. It is contemplated, however, that this trim loss would be minimal, as alignment errors in stacking are typically less than $1/16^{th}$ of an inch on each end of the preform. In a typical shade width of four feet, this $1/8^{th}$ of an inch of trim loss represents less than 0.3% of material waste, an insubstantial amount.

The presently disclosed equipment and process could be modified without departing from some of the important aspects of the disclosed method. For example, the strip on fabric supply roll 26 could be pre-folded into the shape of the preform before it is wound onto that roll, thereby eliminating the creasing, folding and fold-setting heating steps from taking place within strip forming assembly 22. Other modifications include use of other types of digital printing devices, such as dye sublimation or wax transfer; or non-digital printing (such as by spray or transfer rolls) or even elimination of the coloring step by using pre-colored fabric on the supply roll; or application of the adhesive lines after rather than before the preforms are cut to length, or as interrupted, stitch-like lines; or producing pre-cut preforms in several standard lengths (as for common window widths), perhaps combined with post-manufacture trimming to final window covering-size width (i.e., preform length), with or without bonding during initial manufacture; or producing bonded preform assemblies of a standard number of cells corresponding to the desired drop length for windows of a standard height, followed by cutting to final window covering width only upon receipt of a customer order; or use of other types of heating to cure the adhesive. In-line punching of clearance holes for control cords could also be accomplished at an appropriate station within strip forming assembly 22, before strip 28 is cut to length.

It is also contemplated that the length of the initially cut-to-length preform could be selected to correspond to the combined length of two or more preforms, of either identical or different lengths. For example, if a customer were to order multiple window coverings of identical style, color and height, but of different widths (e.g., three and four feet), the initial preform could be cut to their combined length (seven feet in the example). Following accumulation and bonding of that combined-length array (to assure positional stability of the preforms in the array to be cut), the bonded array could then be cut again to divide that array into the two (or more) specified window covering widths.

Strip forming assembly 22 can be readily modified to form other types of known window covering panels, such double-cell honeycomb, pleated shades, non-pleated or non-creased shades such as billowed or open flap Roman shades, conventional roller shades formed of horizontal strips of different materials or colors or patterns, or fabric-vane window shadings (in both horizontal or vertical orientation), each of which is or could be comprised of multiple preform elements directly joined to adjacent such elements. The conversion steps may include one or more of the following: a change in the material or width of the fabric on supply roll 26, a change in number or lateral position of the creasing wheels at creasing station 42, a change in the number or position of adhesive applicators at station 48, and a change in the out feed apparatus for accumulating preforms that are not to be stacked vertically.

FIGS. 7 and 8 show examples of differently shaped preforms used to form other types of window covering panels. FIG. 7A shows a three-cell fragment of a conventional double-cell window covering panel 114, fabricated from two identical preforms 116a and 116b (one of which is shown in FIG. 7B) that have been bonded together. Each preform has two creases 120 and three longitudinally extending adhesive lines, 122, 124 and 126. The creases serve as crisp hinge points that, after folding and heat-setting of the folds in strip former assembly 22, create preform 116 having central portion 128, long flap 130 and short flap 132. Preferably, after creases 120 are applied and the two flaps folded into the configuration shown in FIG. 7B, adhesive line 124 is applied to ultimately secure flap 130 to central portion 128, thereby defining a first closed cell. Subsequently, before preform exits strip former assembly 22, adhesive lines 122 and 126 are applied. Thereafter, when preforms 116 have been cut to length and stacked (as previously described with respect to FIGS. 3-4), adhesive lines 122b and 126b will bond preforms 116a and 116b together, as shown in FIG. 7A. Alternatively, preform 115 could be formed in a C-shape rather than the Z-shape of FIG. 7B, by folding short flap 132 upwardly rather then downwardly, and shifting adhesive line 126 to the upper surface of flap 132 adjacent its free end. In that position, adhesive line 126 would contact the upper adjacent preform rather then the lower adjacent preform.

FIG. 8A illustrates a two-preform fragment of fabric-vane window shading 134 made by bonding together adjacent and partially overlapping identical three-component preforms 136a and 136b. Other multi-component preforms that may be used to make fabric-vane window shadings are disclosed in commonly assigned U.S. Pat. No. 6,024,819 to Corey and U.S. Pat. No. 6,302,982 to Corey and Marusak. The presently disclosed method of forming and assembling window coverings could also be used to create fabric-vane window shadings having configurations disclosed in those earlier patents. Referring to FIGS. 8A and 8B, by way of example, the forming process would begin with a three-component strip consisting of at least two dissimilar fabrics whose adjoining longitudinal edges have been connected by gluing, ultrasonic welding, thermal bonding or stitching. Ultrasonic welding is preferred, because it is speedy and permits precise location of adjoining edges. Outer strips 138, 140 are formed of relatively translucent or sheer material, and may be formed of the same or different fabrics. Central portion 142 is formed of a relatively opaque material, opacified by use of a more densely woven material, or by coating or laminating or by insertion of opaque inserts into an integrally formed pocket. Alternatively, central portion 142 could be formed from the same uncolored fabric as outer strips 138, 140, and then digitally colored by the ink jet printer 38 to provide the desired contrast. Preferably, the three-component strip would be wound in a pre-joined state on supply reel 26, but the joining of the adjacent components 138, 140, 142 of the three-element strip could be accomplished in a preliminary, but still continuous, extension of the disclosed strip former assembly 22, or it could be achieved by folding rather than by ultrasonic joining. As shown in FIGS. 8A and 8B, adhesive lines 144 and 146 are applied to preform 136 within strip former 22, but without creasing or folding steps in the disclosed fabric-vane window shadings embodiment.

As shown in FIG. 8A, formation of a fabric-vane window shading requires laterally staggered, only partially overlapping, positioning of successive preforms 136*a*, 136*b*, similar to the way bacon strips are placed in a display pack. Successive preforms would, as in the case of the other disclosed preform configurations, still have their ends in lateral registry with each other. That arrangement is required so that successive sheer strips 138*a*, 138*b*, etc., will form adjacent segments of the front or rear sheer panel of the completed fabric-vane window shading, while successive sheer strips 140*a*, 140*b*, etc., will form adjacent segments of the other sheer panel. As is common with this type of product, the angular position of opaque vanes 142 between the parallel front and rear sheer panels is manually controlled by inducing relative movement between the two sheer panels. To accomplish that staggered rather than fully overlapped and stacked configuration, receiver/stacker assembly 54 would need to be modified so that the cut preform elements are pushed from receiver belt 52 onto a transversely moving or indexing belt rather, than into a vertical accumulator chute 68. The resulting product could be used as a vertical sheer or fabric-vane window shading, with the vanes oriented vertically, rather than as a fabric-vane window shading having horizontally oriented vanes.

Those skilled in the art will recognize that still other configuration of performs may be created using the apparatus and method disclosed herein to form repeating and directly joined elements of other types of window coverings. Appropriate modifications of creasing wheel position, folding station configuration and adhesive applicator position would be required.

One benefit of the above described RF energy-curing process is the application to multiple linear adhesive features that are neither 'parallel' (i.e., reaching from one electrode to the other) nor 'perpendicular' (i.e., presenting a broad flat target normal to the field). In some instances, called 'stray field' heating, the adhesive to be heated cannot be arranged either perpendicularly or parallel to the electrode plates. In the described process, however, the adjacent substrate material is not RF-conductive and so experiences little absorption of the RF energy from stray fields. The fabric material supplied from reel 26 may be formed from woven fabric, non-woven fabric, polyester, or the like. The described process relies on the uniform placement of discontinuous absorbent zones (adhesive lines 14) to produce uniform absorption and heating of those zones. Otherwise, the field stability and heating uniformity becomes unsustainable.

Another benefit is the adaptation of an RF press 96 to a flexible substrate. The RF curing of a complex, flexible, expandable, product, as described in the above-cited commonly assigned published application, US 2007/0251637, is believed to be unique and offers advantages over the prior art methods of bonding delicate window covering materials.

As will be clear to one skilled in the art, the described embodiments and methods, though having the particular advantages of compactness and convenience, are not the only methods or arrangements contemplated. Some exemplary variants include: a) material to be treated and bonded can be fed through the RF field in a continuous stream, rather than by batches; b) material blocks to be bonded can be fed through a smaller field area, curing from one end to the other sequentially, rather than the whole block at once; and c) any combination of frequencies and materials receptive thereto could be substituted for the chosen RF and adhesives.

The precise application of activation energy to the adhesive rather than the bulk stack of material has many advantages including: a) reduced total energy usage; b) reduced cycle time without waiting for heating and cooling the bulk material or containments; c) reduced handling of goods by in-line treatment rather than large oven-run batches; d) reduced thermal distortions and discolorations due to uneven heating of stack materials; e) precise and uniform heating of adhesive to assure uniform and complete bonding of adjacent layers without bleed-through to farther layers; f) usability with stack materials that are not amenable to thermal or other adhesive curing cycles in bulk; and g) improved regularity of pleat alignment and adhesive line positioning by reduced clamping and thermal loads during cure.

The use of a digitally-controlled ink jet printer provides great flexibility in not only the color and pattern of inks applied to the supplied fabric, but also variation in color or pattern along the length of the strip being fed through the printer. That is, non-uniform coloring or patterning can be applied, not only along the length of what will (after cutting) be an individual preform, but also each preform of a given window covering need not be identical in color or pattern to others in a given stack and window covering. Thus, when differently colored or patterned successive preforms of a given window covering are properly collated, a large pattern, border or image can be created that requires integration of multiple preforms of the window covering for its complete rendition, with each preform only supplying a portion of the entire desired design.

The process disclosed above provides virtually total elimination of waste material formerly inherent in the cutting down of large bolts of fully formed expandable goods to customer-ordered window covering sizes. Also eliminated are the additional costs of handling such materials during and following fabrication of the bolts, as well as the storage space and costs of storing large bolts and remnants of each of the various colors and fabrics within a manufacturer's catalog of available products. This process also permits faster conversion of customer orders to deliverable goods, with fewer order entry and handling errors. To that end, it is contemplated that customer orders, for a specified window covering type, including style, window height and width, choice of fabric, color and pattern, could be transmitted by the Internet or other electronic communications medium from a retail outlet or interior designer's studio to the manufacturer, where appropriate software and look-up tables could convert the customer's specifications into digital instructions for the system disclosed herein. For example, as is known in the art, the specified vertical height or "drop height" of a cellular type window covering can be readily converted to the required number of cells or preforms by reference to a look-up table.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated, without departing from its spirit or scope. The scope of the invention is limited solely by the following claims.

The invention claimed is:

1. A method of making a plurality of different foldable, collapsible window shades of customer-specified properties, each shade being formed of a plurality of elongated preforms cut from a moving narrow strip of elongated flexible material, said method comprising:
    moving a strip of elongated flexible material through a strip-forming apparatus to form a plurality of preforms each having characteristics of a custom shade, including a length determined by the width of the shade to be formed from the preforms;
    moving the plurality of preforms directly from the strip-forming apparatus into a stack in an accumulator until the necessary number of preforms for forming a custom shade have been moved into the stack to form a complete preform stack; and
    moving the complete preform stack containing the necessary number of preforms for forming a custom shade into a curing station to cure bonding material placed on the preforms in the strip-forming apparatus to cause the plurality of preforms to bond together to form a custom shade;
    wherein preforms are continuously formed and processed in the strip-forming apparatus and continuously stacked in the accumulator to sequentially form a plurality of complete preform stacks, each compete preform stack containing the necessary number of preforms for a custom shade, and wherein the complete preform stacks are transferred from the accumulator into the curing station as they are completed so as to continuously form custom shades of different specifications including height, width or color.

2. The method of claim 1, wherein;
    the stack of preforms is immediately moved out of the accumulator once the stack contains the necessary number of preforms for forming a custom shade so that additional stacks of preforms may be stacked continuously.

3. The method of claim 1, wherein the quantity of wasted strip material is less than about 15% of the total length of strip material cut from said portions of said continuous strip.

4. The method of claim 1, wherein said strip is a composite of at least two strips of dissimilar materials joined to each other along a longitudinal joint therebetween.

5. The method of claim 1, wherein said bonding material is deposited on first and second portions of said moving continuous strip prior to said strip being cut.

6. The method of claim 1, further comprising coupling a top-most preform to a top rail, and coupling a bottom-most preform to a bottom rail, said top rail and said bottom rail having lengths corresponding to the widths of said first and second customer-specified shades to form said respective shades.

7. The method of claim 1, further comprising depositing colorant onto a first portion of said moving continuous strip of flexible material.

8. The method of claim 1, wherein stacks of cut preforms are continuously accumulated as complete preform stacks are continuously transferred for curing in a curing station.

9. The method of claim 1, further comprising compressing the complete preform stack before transferring the complete preform stack to the curing station to aid in preform-to-preform adhesion before curing.

10. A method as in claim 1, wherein partially-curing bonding material is applied to said preforms in said strip-forming apparatus so as to achieve a firm bond between stacked preforms only after curing at a subsequent curing station.

11. A method as in claim 10, further comprising applying pressure to the stack of preforms to compress the stack of preforms to aid in preform-to-preform adhesion.

12. A method as in claim 1, wherein preforms sufficient to form at least a portion of a custom shade are continuously moved from the strip-forming apparatus into a stack while an immediately-previous complete preform stack is being moved into the curing station.

13. A method as in claim 12, wherein the preform stack is completed after the step of moving the immediately-previous complete preform stack is completed.

14. A method as in claim 1, wherein the strip of elongated flexible material is continuously moved from a supply of strip material to the strip-forming apparatus at a substantially fixed rate.

15. A method of fabricating a finished window covering, the window covering comprising elongated preforms of a number and length to fit a window of a previously customer-specified height and width, the method comprising the steps of:
    providing a length of elongated strip material;
    cutting the elongated strip of material into a particular number of preforms necessary to fabricate the window covering having the customer-specified height, wherein each preform is of a uniform length that substantially corresponds to the customer-specified width;
    positioning said number of said pre-cut preforms in side-by-side adjacency in an accumulator to form an array of preforms having their adjacent longitudinal ends in lateral alignment with each other;
    moving said array of preforms from the accumulator to a curing station; and
    bonding together adjacent preforms to form an assembled array of preforms by holding said arrayed preforms in position and contact and curing a bonding material that has been preapplied to said elongated strip material prior to said bonding step.

16. The method of claim 15 wherein a predetermined color and/or pattern is applied to at least a portion of said strip material following said providing step, wherein said coloring and/or patterning step is applied by a digital printing device.

17. The method of claim 16 wherein said pattern varies as between at least some of said preforms so that the assembled array of preforms reveals an integrated composite pattern that is larger than and distinct from the pattern applied to any individual preform.

18. The method of claim 15 including forming the window covering with a finished customer specified length, width, color and pattern directly from uncolored fabric.

19. The method of claim 15 wherein said array of preforms comprises a plurality of expandable cells.

20. The method of claim 15 wherein said positioning step comprises stacking successive preforms into a substantially vertical column.

21. The method of claim 15 wherein said preforms are formed of flexible fabric material.

22. The method of claim 15 wherein said provided length of elongated strip material is in a flat and unfolded condition.

23. The method of claim 22 which further comprises the step of folding said elongated strip material along lengthwise fold lines to form the cross-sectional shape of said preform.

24. The method of claim 15 wherein said provided length of elongated strip material is a composite of at least two strips of dissimilar material joined to each other along a joint therebetween.

25. The method of claim 15 wherein the length and width of said assembled array, when fully expanded, essentially correspond to said previously specified height and width, with substantially no excess material to be removed.

26. The method of claim 15 wherein said providing step comprises continuously feeding said elongated strip material from a supply roll.

27. The method of claim 15 wherein said length of elongated strip material is flat and without final coloring, and further comprising the steps of:
receiving from a remotely-located customer an order for a window covering that includes design specification selected from a group of specifications including color, pattern and window covering height and width;
generating digital instructions for implementing said selected specifications;
providing automatic equipment capable of (i) applying selected color and/or patterns to said strip material, (ii) cutting linearly moving material to a length substantially corresponding with one of said height and width specifications; and (iii) counting the number of preforms required to form the finished window covering having the other of said height and width specifications, all in response to said digitally provided instructions;
continuously feeding said elongated strip material into said automated equipment to conduct said method.

28. The method of claim 15 including applying the bonding material to the length of elongated strip material before the step of cutting.

29. A method of making a plurality of different foldable, collapsible window shades of customer-specified properties, each shade being formed of a plurality of elongated preforms cut from a moving narrow strip of elongated flexible material, said method comprising:
moving a strip of elongated flexible material through a strip-forming apparatus to form a plurality of preforms each having characteristics of a custom shade, including a length determined by the width of the shade to be formed from the preforms;
moving the plurality of preforms directly from the strip-forming apparatus into a stack in an accumulator until the necessary number of preforms for forming a custom shade have been moved into the stack to form a complete preform stack; and
moving the complete preform stack containing the necessary number of preforms for forming a custom shade from the accumulator to a curing station to cure bonding material placed on the preforms in the strip-forming apparatus to cause the plurality of preforms to bond together to form a custom shade;
wherein preforms are continuously formed and processed in the strip-forming apparatus and continuously stacked to sequentially form a plurality of complete preform stacks, each compete preform stack containing the necessary number of preforms for a custom shade, and wherein the complete preform stacks are immediately moved out of the accumulator and into the curing station as they are completed so that additional stacks of preforms may be stacked to continuously form custom shades of different specifications including height, width or color.

30. The method of claim 29, wherein the quantity of wasted strip material is less than about 15% of the total length of strip material cut from said portions of said continuous strip.

31. The method of claim 29, wherein said strip is a composite of at least two strips of dissimilar materials joined to each other along a longitudinal joint therebetween.

32. The method of claim 29, wherein said bonding material is deposited on first and second portions of said moving continuous strip prior to said strip being cut.

33. The method of claim 29, further comprising coupling a top-most preform to a top rail, and coupling a bottom-most preform to a bottom rail, said top rail and said bottom rail having lengths corresponding to the widths of said first and second customer-specified shades to form said respective shades.

34. The method of claim 29, further comprising depositing colorant onto a first portion of said moving continuous strip of flexible material.

35. The method of claim 29, wherein stacks of cut preforms are continuously accumulated as complete preform stacks are continuously transferred for curing in a curing station.

36. The method of claim 29, further comprising compressing the complete preform stack before transferring the complete preform stack to the curing station to aid in preform-to-preform adhesion before curing.

37. A method as in claim 29, wherein partially-curing bonding material is applied to said preforms in said strip-forming apparatus so as to achieve a firm bond between stacked preforms only after curing at a subsequent curing station.

38. A method as in claim 29, further comprising applying pressure to the stack of preforms to compress the stack of preforms to aid in preform-to-preform adhesion.

39. A method as in claim 29, wherein preforms sufficient to form at least a portion of a custom shade are continuously moved from the strip-forming apparatus into a stack while an immediately-previous complete preform stack is being moved into the curing station.

40. A method as in claim 29, wherein the preform stack is completed after the step of moving the immediately-previous complete preform stack is completed.

41. A method as in claim 29, wherein the strip of elongated flexible material is continuously moved from a supply of strip material to the strip-forming apparatus at a substantially fixed rate.

* * * * *